United States Patent
Six et al.

(10) Patent No.: US 6,841,115 B2
(45) Date of Patent: Jan. 11, 2005

(54) MOLD RELEASE AGENT AND PROCESS FOR THE PRODUCTION OF PLASTIC MOLDED PARTS

(75) Inventors: Christian Six, Neuss (DE); Michael Schneider, Köln (DE)

(73) Assignee: Bayer Aktiengesellschaft, Levekrusen (DE)

( * ) Notice: Subject to any disclaimer, the term of this patent is extended or adjusted under 35 U.S.C. 154(b) by 0 days.

(21) Appl. No.: 10/302,545

(22) Filed: Nov. 22, 2002

(65) Prior Publication Data

US 2003/0192455 A1 Oct. 16, 2003

(30) Foreign Application Priority Data

Nov. 28, 2001 (DE) .......................................... 101 58 154

(51) Int. Cl.[7] .......................... B29C 33/60; B29C 44/58; B29C 67/24
(52) U.S. Cl. .................. 264/338; 264/330; 264/331.19; 264/213
(58) Field of Search .............................. 106/38.2, 38.22, 106/38.23, 38.51, 38.4, 38.7; 428/160; 264/331.19, 338, 213, 330; 604/22, 164.01, 164.06, 164.11, 173, 181, 264, 523

(56) References Cited

U.S. PATENT DOCUMENTS

| 4,058,537 A |   | 11/1977 | Mueller .................... 260/346.3 |
| 5,347,031 A | * | 9/1994 | Koyama et al. ............. 558/260 |
| 5,716,580 A | * | 2/1998 | Wagner et al. .......... 264/331.19 |
| 6,010,476 A | * | 1/2000 | Saadat .......................... 604/22 |
| 6,461,296 B1 | * | 10/2002 | Desai .......................... 600/210 |

FOREIGN PATENT DOCUMENTS

| DE | 199 19 826 | 11/2000 |
| DE | 199 19 827 | 11/2000 |
| DE | 199 28 675 | 12/2000 |
| DE | 199 28 676 | 12/2000 |
| DE | 199 28 687 | 12/2000 |
| DE | 199 28 688 | 12/2000 |
| DE | 199 28 689 | 12/2000 |
| EP | 0 597 115 | 5/1994 |
| EP | 1 008 429 | 6/2000 |
| GB | 1 565 124 | 4/1980 |
| JP | 62-271711 | * 11/1987 |
| JP | 7-290601 | 11/1995 |
| WO | 01/17743 | 3/2001 |
| WO | 01/23160 | 4/2001 |

OTHER PUBLICATIONS

Patent Abstracts of Japan vol. 009, no. 078 (C–274), (Apr. 6, 1985) & JP 59 213716 A (Neosu: KK; Others: 01), (Dec. 3, 1984) Zusammenfassung.

* cited by examiner

*Primary Examiner*—Michael Marcheschi
(74) *Attorney, Agent, or Firm*—Joseph C. Gil; Lyndanne M. Whalen

(57) ABSTRACT

Mold release agents useful for the production of plastic molded parts having reduced concentration of undesirable, potentially health hazardous substances in the edge zone and on the surface of the molded part and a process for the production of low toxicity plastic molded parts using such mold release agents. These mold release agents have at least one group which is reactive with the undesirable materials that form on the surfaces and in the edge zones of the molded parts.

1 Claim, No Drawings

MOLD RELEASE AGENT AND PROCESS FOR THE PRODUCTION OF PLASTIC MOLDED PARTS

BACKGROUND OF THE INVENTION

The present invention relates to mold release agents for the production of plastic molded parts that reduce the concentration of undesirable, potentially health hazardous substances in the edge zone and on the surface of the molded part, as well as a process for the production of non-toxic plastic molded parts using such mold release agents.

High molecular weight synthetic substances (polymers) such as plastic materials, synthetic resins, fibers and elastomers play an extremely important role in technology. The processing of plastics is carried out, for example, by cold or hot forming, in particular by rolling, extrusion or compression. With "hot press molding", the material is added in the form of tablets or granules to the mold and heated; the material that has become plastic fills all of the cavities of the compression mold accurately and retains its shape after cooling. Sheets are cast, for example, by processing solutions. The production of plastic molded parts may be carried out by processing finished polymers in the form of granules or the like or by conversion of reaction mixtures. For example, many polyurethanes, particularly polyurethane foams, are produced by the one-stage or one-shot process, in which the raw material components are metered in accurately according to a predetermined formulation and mixed. The resultant reactive mixture is then discharged from the mixing chamber into shaping devices. Another process for making polyurethanes is the two-stage process or prepolymer process, which is important, for example, in the production of elastomers.

During the production of plastic molded parts, the reverse formation of monomers may occur due to thermal decomposition of the polymer. In the case of many polymers, these monomers which may be very reactive are classified as hazardous to health. In addition, the molded part formed from polymers in which such decomposition has occurred may contain traces of other reaction byproducts and/or decomposition products, or additives such as catalysts, stabilizers, emulsifiers, blowing agents, etc., that may be hazardous to health.

For health and safety reasons, it is desirable to keep the concentration of such potentially health hazardous substances as low as possible. Various methods have been proposed for this purpose. One method for eliminating the undesirable substances is post-treatment of the molded part which is time-consuming and raises production costs. Another recommended approach is addition of a substance that chemically binds the undesirable substances to the polymer-forming reaction mixture or to the polymer during processing.

GB-A 1 565 124 teaches a process for the production of polyurethane foams in which a trapping compound for aromatic amines, specifically TDA (toluenediamine, diaminotoluene), is added to the individual reactive components. From the examples given in this disclosure, it can be seen that the addition of 0.5 to 8 wt. % of aliphatic diisocyanate is particularly effective, though only by adding $\geq 5$ wt. % of the expensive aliphatic diisocyanates can significant results be detected. However, due to the addition of considerable amounts of aliphatic polyisocyanate, the mechanical and/or physical properties of the polyurethane foams based on aromatic polyisocyanates are adversely affected.

A large number of cheaper additives and/or auxiliary substances from various classes of chemical compounds are disclosed in DE-A 199 19 826, DE-A 199 19 827, DE-A 199 28 675, DE-A 199 28 676, DE-A 199 28 687, DE-A 199 28 688 and DE-A 199 28 689, to be useful for reducing formation of primary aromatic diamines such as TDA or MDA (methylenediphenylenediamine) during production of flexible polyurethane foams. In this case, too, from 1 to 6 wt. % of the auxiliary substance is added to one of the two reactive components.

A general disadvantage of the addition of such auxiliary substances which act as "traps" for undesirable substances to the plastic-forming formulation, is the occurrence of significant changes in the mechanical and/or chemico-physical specification of the end product. These changes may possibly require a reformulation or modification of the composition of the formulation or of the polymer raw material. This is understandable since, in general, considerable amounts of the auxiliary substance have to be added in order to effectively eliminate the undesirable substances.

In the production of plastics molded parts, interactions take place in the contact zone between the plastic composition and the mold wall. As a result, the composition of the plastic material in the edge zone differs—in some cases only by trace amounts—from the composition in the inner region (core). For example, immediately after the production of polyisocyanate—polyaddition products based on aromatic polyisocyanates, the aromatic amines on which the polyisocyanate is chemically based can be detected in trace amounts in the foam. These aromatic amines are formed as intermediates by hydrolysis of the isocyanate groups of the polyisocyanate that is used, with the release of carbon dioxide. With polyurethane flexible molded foam substances, the content of these aromatic amines in the edge zone (skin) is higher than in the interior of the molded part (core).

It is therefore particularly important to reduce the concentration of the undesirable substances in the edge zone of the plastic molded part. This is also desirable because the surfaces of the plastic molded parts, especially in the case of articles of daily use, constitute the immediate contact surfaces for the processor as well as the ultimate user.

SUMMARY OF THE INVENTION

It has now been found that the concentration of undesirable, in particular potentially health hazardous substances, on the surfaces and in the edge zone of plastic molded parts can be effectively reduced if during production of the molded part, a mold release agent that contains at least one additive that reacts with the undesirable substances and thus acts as a "trap" for these undesirable substances is used.

DETAILED DESCRIPTION OF THE INVENTION

For all processes in which a plastic material is processed on shaping surfaces (compression molds, rollers, etc.) it is important that the end product be undamaged when stripped from the surface or when removed from the mold. For this reason, the shaping surfaces are coated with a mold release agent between the individual processing steps (in the case of molds) or continuously (in the case of rollers). This prevents the plastic molded part from sticking to the shaping surface.

In accordance with the present invention, there may be added to a commercially available mold release agent one or more additives that act as "traps" with respect to the undesirable substances formed as intermediates, and that, for example, in the case of polyurethane flexible molded foams chemically bind aromatic amines in the edge zone. The mold release agent is simply applied as a thin layer or film to the surface of the molded part, which enables the necessary amount of trapping agent to be minimized. It has surprisingly been found that such modified mold release agents can effectively reduce the undesirable substances in the edge zone of plastic molded parts while the original effect of the mold release agent (ensuring demoldability, i.e., damage-free removal of the plastic molded part from the mold) is retained. In particular, in the production of flexible polyurethane molded foams, the high concentration of aromatic amine in the foam skin compared to the foam core can thereby be significantly reduced directly after production as well as after storage.

It has also been found that, in principle, all chemical compounds which react in solution or in pure form with the undesirable substances that are contained in the edge zone of plastic molded parts also act as an additive in commercially available mold release agents employed as "traps". By incorporating the "trap" in small concentrations in the inert matrix of the mold release agent, the "trap" acts substantially more effectively than when added to the reaction mixture of the plastic molded part that is to be produced. In some cases, a "trapping effect" may, in fact, not be observed at all when the trap is added to the reaction mixture.

The present invention accordingly provides mold release agents for plastic molded parts that contain one or more additives that react with the undesirable substances, for example aromatic amines, formed in the production of the molded parts.

Effective additives for mold release agents that are used in the production of polyurethane polyaddition products include, for example, isocyanates, in particular diisocyanates or polyisocyanates; derivatives of inorganic acids; derivatives of organic acids; derivatives of carbonic acid; sulfur-containing compounds; urea and/or its derivatives; and organic, cyclic compounds with a molecular weight of from 200 to 3000 g/mole, preferably from 200 to 1300 g/mole (hereinafter also termed "macrocyclic compounds").

Suitable polyisocyanates include aliphatic, cycloaliphatic, aralphatic, aromatic and heterocyclic isocyanates, preferably diisocyanates or polyisocyanates, such as those described in Justus Liebigs Annalen der Chemie 562 (1949) 75. Examples of suitable polyisocyanates are those represented by the formula $Q(NCO)_n$ in which n is a whole number from 2 to 4, preferably 2, and Q represents an aliphatic hydrocarbon radical with 2 to 18 (preferably 6 to 12) C atoms, a cycloaliphatic hydrocarbon radical with 4 to 15 (preferably 5 to 10) C atoms, an aromatic hydrocarbon radical with 6 to 15 (preferably 6 to 13) C atoms, or an aralphatic hydrocarbon radical with 8 to 15 (preferably 8 to 13) C atoms. The industrially readily accessible polyisocyanates, for example 1,6-hexamethylene diisocyanate, isophorone diisocyanate (IPDI), 4,4'-dicyclohexamethylenemethane diisocyanate ($H_{12}$-MDI), 1,2,4,5-tetramethylbenzene diisocyanate, 1,4-di-(isocyanatomethyl)cyclohexane, 1,3-bis-(isocyanato-1-methylethyl)benzene ("TMXDI"), 2,4-and 2,6-toluene diisocyanate as well as arbitrary mixtures of these isomers ("TDI", e.g. Desmodur® T80, Bayer AG), polyphenyl-polymethylene polyisocyanates such as can be produced by aniline-formaldehyde condensation and subsequent phosgenation ("crude MDI", e.g. Desmodur® 44V20L, Bayer AG), polyisocyanates containing carbodiimide groups, urethane groups, allophanate groups, isocyanurate groups, urea groups or biuret groups ("modified polyisocyanates") are preferred. Particularly preferred are those modified polyisocyanates derived from 2,4- and/or 2,6-toluene diisocyanate and/or from 4,4'-and/or 2,4'-diphenylmethane diisocyanate and/or from 1,6-hexamethylene diisocyanate and/or isophorone diisocyanate. The organic diisocyanates and polyisocyanates may be used individually or in the form of mixtures. Most preferred are TMXDI and cycloaliphatic diisocyanates, especially IPDI, 1,4-di(isocyanatomethyl)-cyclohexane and $H_{12}$-MDI (e.g. Desmodur® W, Bayer AG).

Derivatives of mineral acids which may be included in the mold release agent of the present invention include: dimethyl sulfate, diethyl sulfate, phosphoric acid trimethyl ester and esters of polyphosphoric acids.

Suitable derivatives of organic acids useful as additives to the mold release agent of the present invention include esters of organic acids, in particular those represented by the general formula $R_1C(=O)(OR_2)$ in which $R_1$ represents hydrogen or an aliphatic, cycloaliphatic, aralphatic or aromatic hydrocarbon radical and $R_2$ represents an aliphatic, cycloaliphatic, aralphatic or aromatic hydrocarbon radical. The radicals $R_1$ and/or $R_2$ may be branched and/or substituted radicals. Examples of suitable esters are: methyl formate, ethyl acetate, methyl dodecanoate, ethyl acetoacetate, diethyl malonate, and lactones, for example those of $C_3$–$C_6$-hydroxycarboxylic acids with a molecular weight of from 70 to 300 g/mole, such as β-propiolactone, γ-butyrolactone, γ-verolactone, ε-caprolactone, γ-decanolactone, δ-decanolactone, γγ-dimethylbutyrolactone and/or α-ethyl-γ-methylbutyrolactone.

Other suitable derivatives of organic acids useful as additives included in the mold release agents of the present invention are amides such as those represented by the general formula $R_1C(=O)(NR_2R_3)$ in which $R_1$ represents hydrogen or an aliphatic, cycloaliphatic, aralphatic or aromatic hydrocarbon radical and $R_2$ and $R_3$ each represent an aliphatic, cycloaliphatic, aralphatic or aromatic hydrocarbon radical. The radicals $R_1$, $R_2$ and $R_3$ may also be branched-chain and/or substituted radicals. Examples of suitable amides are dimethylformamide, dimethylacetamide, cyclohexanoic acid amide, and lactams, in particular lactams of $C_3$–$C_6$-aminocarboxylic acids with a molecular weight of from 70 to 300 g/mole, such as β-propiolactam, 2-pyrrolidone, N-methylpyrrolidone and 2-piperidone.

Cyclic esters such as those with a molecular weight of from 150 to 500 g/mole may also be used as additives useful in the mold release agents of the present invention. Preferred cyclic esters are the condensation products of aliphatic, cycloaliphatic, aralphatic and/or aromatic dicarboxylic acids having 2 to 15 carbon atoms and aliphatic, cycloaliphatic, aralphatic and/or aromatic dihydric alcohols having from 2 to 15 carbon atoms. Examples of suitable additives are the cyclic esters of adipic acid and ethylene glycol and/or diethylene glycol. These esters are formed, for example, as byproducts in the production of polyester polyols based on the aforementioned components.

Other suitable derivatives of organic acids useful in the practice of the present invention are carboxylic acid anhydrides such as anhydrides of aliphatic, cycloaliphatic, aralphatic or aromatic carboxylic acids having from 1 to 10 (preferably from 1 to 2) carboxyl groups. Mixed anhydrides or cyclic anhydrides may also be used. Polyanhydrides obtainable from dicarboxylic acids and/or polycarboxylic acids, and/or copolymers of anhydrides and alkenes may also be used as anhydrides. Preferably, the carboxyl groups of the compounds are largely converted, most preferably, completely converted, into the corresponding anhydrides. The carboxylic acid anhydrides generally have a molecular weight of from 60 to 1,000,000 g/mole. Examples of suitable anhydrides include: formic anhydride, acetic anhydride, propionic anhydride, fumaric anhydride, adipic anhydride, phthalic anhydride, glutaric anhydride, pyrrolidine-2,3,4,5-tetracarboxylic anhydride, malonic anhydride, benzoic anhydride, polymaleic anhydride, maleic anhydride, pyromellitic anhydride, phenylacetic anhydride, anhydrides of maleic acid and alkenes, such as n-octylene-succinic anhydride, n-dodicyclene-succinic anhydride, and/or copolymers of anhydrides and other monomers, e.g., poly (ethylene-co-acrylic acid butyl ester-co-maleic anhydride) or poly(styrene-co-maleic anhydride).

Also suitable are derivatives of carbonic acid such as carbonic acid esters represented by the general formula $(R_1O)C(=O)(OR_2)$ in which $R_1$ and/or $R_2$ represent(s) an aliphatic, cycloaliphatic, araliphatic or aromatic hydrocarbon radical, which may also be branched-chain and/or substituted, or form a cyclic ester of carbonic acid. Examples of such derivatives are: dimethyl carbonate, diethyl carbonate, diphenyl carbonate, ethylene carbonate and propylene carbonate.

Suitable sulfur-containing compounds include the esters of sulfonic acids represented by the general formula $(R_1S(=O)_2(OR_2)$ in which $R_1$ and/or $R_2$ represent(s) an aliphatic, cycloaliphatic, araliphatic or aromatic hydrocarbon radical, which may also be branched-chain and/or substituted. Cyclic esters of aliphatic and aromatic sulfonic acids (so-called sultones) are also suitable. Examples of such sulfur-containing compounds are: methanesulfonic acid methyl ester, p-toluenesulfonic acid methyl ester, 1,3-propanesultone, 1,4-butanesultone, 2,4-butanesultone, tolylsultone, 1-naphthyl-8-sulfonic acid sultone and 2-sulfobenzoic acid cycloanhydride.

Suitable ureas include those compounds represented by the general formula $(R_1R_2N)C(=O)(NR_3R_4)$ in which $R_1$, $R_2$, $R_3$ and/or $R_4$ represent(s) hydrogen or an aliphatic, cycloaliphatic, araliphatic or aromatic hydrocarbon radical, which may also be branched-chain and/or substituted and aliphatic, cycloaliphatic, araliphatic or aromatic amides of carbonic acid, urethanes and cyclic ureas. Examples of such compounds include: urea, bis(trimethylsilyl) urea, tetramethyl urea, tetraphenyl urea, ethylene urea and propylene urea.

Suitable macrocyclic compounds are generally known compounds such as cyclodextrines, resocarenes, cyclophanes and/or cyclocalixarenes, which may in each case be present in modified form. Preferred macrocyclic compounds are α-cyclodextrine, β-cyclodextrine, γ-cyclodextrine, reaction products of these cyclodextrines with alkylene oxides, 4-tert.-butylcalix[4]arene, 4-tert.-butylcalix[6]arene, 4-tert.-butylcalix[8]arene, 4-sulfocalix-[4]arene, 4-sulfocalix-[6]arene, 4-sulfocalix-[8]arene, C-methylcalix[4]-resorcinarene, tetra-N-pentylcalix[4]-resorcinarene and [2.2]paracyclophane.

Mold release agents are processing additives that, when used, reduce the forces of adhesion between two adjoining surfaces (e.g. molded part and mold), i.e. prevent their mutual bonding, because the mold release agent forms a readily removable film between both surfaces. Mold release agents are used in the form of dispersions (emulsions or suspensions), sprays, pastes, powders and permanent, generally stoved, mold release films. In processing plastics and producing molded foams, silicones (in the form of oils, oil emulsions in water, greases, resins), waxes (substantially natural or synthetic paraffins with or without functional groups), metal soaps, greases and polymers are among the mold release agents used. In order to select the best mold release agent from the processing technology aspect, it is not only necessary to have a basic knowledge of the relevant PUR system, but also of the type of tool material, its surface condition and the geometry of the molded part.

Suitable mold release agents are commercially available and are supplied for example by ACMOS Chemie GmbH & Co. (under the designation Acmos® 180-52), RATEC International GmbH (under the designation PURA® 1448H), Gorapur (under the designations Gorapur® RT 835C, Gorapur® LK 149, Gorapur® LK 888, Gorapur® LH 525, Gorapur LH 157A, Gorapur® RT 2130B, Gorapur® RT 1126B), Marbo Italia S.A. (under the designation Marbo® WR 95101/A) and Productos Concentrol S.A. (under the designation Concentrol® WB33A).

If, in the production of the polyurethane molded parts, a mold release agent containing at least one of additive in accordance with the present invention in an amount of from 0.0001 wt. % up to 20 wt. %, preferably from 0.001 wt. % up to 10 wt. %, most preferably from 0.05 wt. % up to 5 wt. % is used, the edge zone of the molded part has a substantially reduced concentration of the aromatic amine on which the polyisocyanate used is chemically based. The mold release agents of the present invention have proven to be particularly effective for production of flexible polyurethane molded foam parts in which an aromatic polyisocyanate is used as the isocyanate component.

The present invention also provides a process for the production of plastic molded parts, preferably plastic molded parts formed from reactive plastics, in particular polyurethanes, more preferably polyurethane mold foams, most preferably flexible polyurethane molded foams and integral skin foam, in which a) the mold is pretreated with a mold release agent of the present invention, b) the plastic composition required for the formation of the molded part is added to the pretreated mold and the molded part is formed, and c) the formed molded part is then removed.

Suitable molds for the production of plastic molded parts are, in principle, known to the person skilled in the art. As a rule, such molds are made of a metal, for example steel (e.g. black sheet-iron), investment casting alloy or aluminum (e.g. aluminum sheet or cast aluminum), or of a plastic material (e.g. epoxy resin or fiber-reinforced polyester). Depending on the plastic material used and the molded part to be produced, the production of the molded parts may be carried out in an open or closed, heated or unheated, mold.

The treatment of the mold with the mold release agent of the present invention is carried out in a manner known in principle to the person skilled in the art, e.g. by spraying with compressed air into the open mold or by coating with a brush, sponge or cloth. In this connection the actual amount of mold release agent is less important than a uniform application of the mold release agent to the mold surface.

The plastic composition required to form the molded part is added to the pretreated mold and the molded part is then formed. This is carried out by processes known to the person skilled in the art. Injection molding, reaction injection molding (RIM and/or RRIM), blow molding and/or sheet blowing are suitable methods for the production of foams, e.g. polyurethane foams, polystyrene foams (EPS), styrene-copolymer foams, polyisocyanurate foams, polycarbodiimide foams, PVC foams, polycarbonate foams, polyolefin foams, polymethacrylimide foams, polyamide, foams, ABS foams, phenolic resin and urea resin foams (UF foams).

The present invention also provides a process for the production of plastic molded parts in which the mold release agent of the present invention is used.

Having thus described the invention, the following Examples are given as being illustrative thereof. All parts and percentages given in these Examples are parts by weight and percentages by weight, unless otherwise indicated.

EXAMPLES

In order to determine the concentration of aromatic amines on the surface of molded parts of polyurethane flexible molded foam, the skin zone (edge layer, thickness 1 mm) was removed from the freshly produced molded parts after a specified storage time (storage in the dark and in contact with air) and was analyzed by means of the ISOPA I.I.I. detection method for TDA (ISOPA I.I.I. REF. 11397, "Robust method for the determination of toluene diamine content of flexible foams") and/or MDA (ISOPA I.I.I. ref. 11399, "Robust method for the determination of the diaminodiphenylmethane content of flexible polyurethane foams"). The TDA and MDA contents specified in the Examples correspond to the absolute contents (in ppm) in the edge layer of the molded foam part.

Comparative Example 1
Production of a Polyurethane Flexible Molded Foam Based on MDI:

A polyol mixture (A component) was prepared from the starting substances listed hereinbelow:

| | |
|---|---|
| 50 parts by weight | of a polyether polyol with an hydroxyl number (OHZ) of 35 mg KOH/g, a mean functionality of 2.6 and an ethylene oxide (EO)/propylene oxide (PO) ratio of 14/86. |
| 50 parts by weight | of a polyether polyol with an hydroxyl number (OHZ) of 28 mg KOH/g, a mean functionality of 2.4 and an ethylene oxide (EO)/propylene oxide (PO) ratio of 14/86. |
| 3.45 parts by weight | Water |
| 0.26 part by weight | Blowing catalyst (Dabco ® BL-11, Air Products) |
| 0.35 part by weight | Gel catalyst (Dabco ® 33LV, Air Products) |
| 0.53 part by weight | Diethanolamine (DEOA) |
| 0.3 part by weight | Silicone stabilizer (Tegostab ® B 8715LF, Goldschmidt AG) |
| 1.5 parts by weight | of a polyether polyol with an hydroxyl number (OHZ) of 37 mg KOH/g, a mean functionality of 2.9 and an ethylene oxide (EO)/propylene oxide (PO) ratio of 72/28. |

This A component was mixed at a temperature of 25° C. with a B component that was a mixture of 18 wt. % of polymeric MDI and 82 wt. % of a mixture of 2,4'-MDI and 4,4'-MDI in a ratio of 2.3:1 (NCO content 32.5 wt. %). For the production of molded parts, the mixture was added to a 9.5 liter capacity mold which was temperature controlled to 60° C. and treated with a mold release agent (Acmos® 180-52, ACMOS Chemie GmbH & Co.), and left to foam. The amount of the mixture was calculated so that the resulting molded parts would have a molded part density of 55 kg/m$^3$. For the production of molded parts with an Index of 100 (Comparative Example 1a), the mixing ratio of A component to B component was 100:56, and for molded parts with an Index of 80 (Comparative Example 1b) was correspondingly 100:45. The mold was closed with a cover and placed in a press or enclosure in order to counteract the foam pressure and to keep the mold closed. After 5 minutes, the cover was removed and the foam was mechanically compressed until it had an open-cell structure (i.e. did not exhibit any shrinkage).

MDA contents of the skin zone of the molded parts were determined and are reported in the Table below.

| Comp. Ex. | Index | 4,4'-MDA [ppm]$^a$ | 2,4'-MDA [ppm]$^a$ | 2,2'-MDA [ppm]$^a$ | 4,4'-MDA [ppm]$^b$ | 2,4'-MDA [ppm]$^b$ | 2,2'-MDA [ppm]$^b$ |
|---|---|---|---|---|---|---|---|
| 1a | 100 | <0.2 | 3.1 | 1.1 | $^c$) | $^c$) | $^c$) |
| 1b | 80 | 1.8 | 63 | 5.4 | 0.3 | 5.4 | 0.9 |

$^a$)Storage time 24 hours
$^b$)Storage time 7 days
$^c$)Not measured

Mechanical properties of the molded parts (measured after 7 days) were determined and are reported in the Table below.

| Comp. Ex. | Index | Density [kg/m$^3$] | CLD 4/40 [kPa] | Tensile Stress [kPa] | Elong. at Break [%] | DVR 50% [%] | DVR 75% [%] |
|---|---|---|---|---|---|---|---|
| 1a | 100 | 52.4 | 10.0 | 172 | 96 | 6.6 | 10.4 |
| 1b | 80 | 50.1 | 4.3 | 106 | 113 | 6.3 | 7.9 |

CLD 4/40: compressive strength 4$^{th}$ cycle at 40% deformation according to DIN EN ISO 3386-1-98.
DVR: compression set at 50% and 75% deformation (DIN EN ISO 1856).
Tensile stress and elongation at break were determined in accordance with DIN EN ISO 1798.

Examples 1–3

Flexible molded foam parts were produced in the same manner as the parts produced in Comparative Example 1. The mold was pretreated in the usual way with a mixture of 95 wt. % of Acmos® 180-52 mold release agent and 5 wt. % of an additive according to the invention, instead of with only the commercially available mold release agent. The results are summarized in the following tables.

The following additives were used:

A: H$_{12}$-MDI (Desmodur® W, Bayer AG)
B: Isophorone diisocyanate (Desmodur® IPDI, Bayer AG)
C: Polymeric MDI (Desmodur® 4$^4$V20L, Bayer AG The MDA contents of the skin zone of the molded parts were determined and are reported in the Table below.

| Ex. | Index | Add. | 4,4'-MDA [ppm]<sup>a</sup> | 2,4'-MDA [ppm]<sup>a</sup> | 2,2'-MDA [ppm]<sup>a</sup> | 4,4'-MDA [ppm]<sup>b</sup> | 2,4'-MDA [ppm]<sup>b</sup> | 2,2'-MDA [ppm]<sup>b</sup> |
|---|---|---|---|---|---|---|---|---|
| 1a | 100 | A | <0.2 | 2.4 | <0.2 | c | c | c |
| 1b | 80 | A | <0.2 | 10 | <0.2 | c | c | c |
| 2a | 100 | B | <0.2 | 3.1 | <0.2 | c | c | c |
| 2b | 80 | B | 0.3 | 30 | 3.2 | <0.2 | 0.6 | <0.2 |
| 3a | 100 | C | <0.2 | 4.2 | <0.2 | c | c | c |
| 3b | 80 | C | <0.2 | 39 | 4.2 | c | c | c |

<sup>a)</sup>Storage time 24 hours
<sup>b)</sup>Storage time 7 days
<sup>c)</sup>Not measured The mechanical properties of the molded parts (measured after 7 days) were determined and are reported in the Table below.

| Ex. | Index | Density [kg/m³] | CLD 4/40 [kPa] | Tensile Stress [kPa] | Elong. at Break [%] | DVR 50% [%] | DVR 75% [%] |
|---|---|---|---|---|---|---|---|
| 2a | 100 | 52.3 | 9.5 | 162 | 94 | 6.8 | 8.9 |
| 2b | 80 | 51.4 | 4.6 | 117 | 113 | 6.3 | 9.2 |

CLD 4/40: compressive strength 4<sup>th</sup> cycle at 40% deformation according to DIN EN ISO 3386-1-98.

DVR: compression set at 50% and 75% deformation (DIN EN ISO 1856).

Tensile stress and elongation at break were determined in accordance with DIN EN ISO 1798.

Comparative Example 2

A polyol mixture (A component) was prepared from the starting materials listed hereinbelow:

| | |
|---|---|
| 50 parts by weight | of a polyether polyol with an hydroxyl number (OHZ) of 35 mg KOH/g, a mean functionality of 2.6 and an ethylene oxide (EO)/propylene oxide (PO) ratio of 14/86. |
| 50 parts by weight | of a polyether polyol with an hydroxyl number (OHZ) of 28 mg KOH/g, a mean functionality of 2.4 and an ethylene oxide (EO)/propylene oxide (PO) ratio of 14/86. |
| 3.45 parts by weight | Water |
| 0.26 part by weight | Blowing catalyst (Dabco ® BL-11, Air Products) |
| 0.35 part by weight | Gel catalyst (Dabco ® 33LV, Air Products) |
| 0.53 part by weight | Diethanolamine (DEOA) |
| 0.3 part by weight | Silicone stabilizer (Tegostab ® B 8715LF, Goldschmidt AG) |
| 1.5 parts by weight | of a polyether polyol with an hydroxyl number (OHZ) of 37 mg KOH/g, a mean functionality of 2.9 and an ethylene oxide (EO)/propylene oxide (PO) ratio of 72/28. |
| 5 parts by weight | Isophorone diisocyanate (Desmodur ® IPDI, Bayer AG) |

This A component was mixed at a temperature of 25° C. with a B component which was a mixture of 18 wt. % of polymeric MDI and 82 wt. % of a mixture of 2,4'-MDI and 4,4'-MDI in a ratio of 2.3:1 (NCO content 32.5 wt. %). For the production of molded parts, the mixture was added to a 9.5 liter capacity mold which was temperature controlled to 60° C. and treated with a mold release agent (Acmos® 180-52, ACMOS Chemie GmbH & Co.), and left to foam. The amount of the mixture was calculated so that the resulting molded parts would have a density of 55 kg/m³. To produce molded parts with an Index of 80, the mixture ratio of A component to B component was 100:45 (note: the additive Desmodur® IPDI was not included in the calculation of the Index). The mold was closed with a cover and placed in a press or enclosure in order to counteract the foam pressure and to keep the mold closed. After 5 minutes, the cover was removed and the foam was mechanically compressed until it had an open-cell structure (i.e. did not exhibit any shrinkage).

The MDA contents of the skin zone of the molded parts were determined and are reported in the Table below.

| Comp. Ex. | Index | 4,4'-MDA [ppm]<sup>a</sup> | 2,4'-MDA [ppm]<sup>a</sup> | 2,2'-MDA [ppm]<sup>a</sup> | 4,4'-MDA [ppm]<sup>b</sup> | 2,4'-MDA [ppm]<sup>b</sup> | 2,2'-MDA [ppm]<sup>b</sup> |
|---|---|---|---|---|---|---|---|
| 2 | 80 | <0.2 | 4 | <0.2 | <0.2 | 1.5 | <0.2 |

<sup>a)</sup>Storage time 24 hours
<sup>b)</sup>Storage time 7 days

The mechanical properties of the molded parts (measured after 7 days) were determined and are reported in the Table below.

| Comp. Ex. | Index | Density [kg/m³] | CLD 4/40 [kPa] | Tensile Stress [kPa] | Elong. at Break [%] | DVR 50% [%] | DVR 75% [%] |
|---|---|---|---|---|---|---|---|
| 2 | 80 | 51.9 | 6.8 | 165 | 124 | 8.6 | 12.7 |

CLD 4/40: compressive strength 4<sup>th</sup> cycle at 40% deformation according to DIN EN ISO 3386-1-98.

DVR: compression set at 50% and 75% deformation (DIN EN ISO 1856).

Tensile stress and elongation at break were determined in accordance with DIN EN ISO 1798.

Comparative Example 3

Production of a Polyurethane Flexible Molded Foam Based on TDI:

A polyol mixture (A component) was prepared from the starting substances listed hereinbelow:

| | |
|---|---|
| 100 parts by weight | of a polyol with an hydroxyl number (OHZ) of 28 mg KOH/g, a mean functionality of 2.4 and an ethylene oxide (EO)/propylene oxide (PO) ratio od 18/82 |
| 3.2 parts by weight | Water |
| 0.1 part by weight | Blowing catalyst (Dabco ® BL-11, Air Products) |
| 0.25 part by weight | Gel catalyst (Dabco ® 33LV, Air Products) |
| 1.0 part by weight | Diethanolamine (DEOA) |
| 1.0 part by weight | Silicone stabilizer (Tegostab ® B 8719, Goldschmidt AG) |

This A component was mixed at a temperature of 25° C. with TDI having an NCO content of 48.3 wt. % (Component B: Desmodur® T80, Bayer AG). For the production of molded parts, the mixture was added to a 9.5 liter capacity mold which was temperature controlled to 60° C. and treated with a mold release agent (Acmos® 180-52, ACMOS Chemie GmbH & Co.), and left to foam. The amount of the mixture was calculated so that the resulting molded parts would have a molded part density of 42 kg/m$^3$. For the production of molded parts with an Index of 100 (Comparative Example 3a) the mixing ratio of A component to B component was 100:36, and for molded parts with an Index of 80 (Comparative Example 3b) the mixing ratio was 100:29. The mold was closed with a cover and placed in a press or enclosure in order to counteract the foam pressure and to keep the mold closed. After 6 minutes, the cover was removed and the foam was mechanically compressed until it had an open-cell structure, i.e. did not exhibit any shrinkage.

The TDA contents of the skin zone of the molded parts were determined and the results are reported in the Table below.

| Comp. Ex. | Index | 2,4-TDA [ppm]$^a$ | 2,6-TDA [ppm]$^a$ | 2,4-TDA [ppm]$^a$ | 2,6-TDA [ppm]$^b$ | 2,4-TDA [ppm]$^b$ | 2,6-TDA [ppm]$^b$ |
|---|---|---|---|---|---|---|---|
| 3a | 100 | 2.8 | 231.3 | 0.5 | 11.0 | 0.4 | 1.4 |
| 3b | 80 | 8.0 | 484.0 | —$^d$ | —$^d$ | 1.5 | 43.5 |

$^a$)Storage time 24 hours
$^b$)Storage time 7 days
$^c$)Storage time 14 days
$^d$)Not measured The mechanical properties of the molded parts (measured after 7 days) were determined and the results are reported in the Table below.

| Comp. Ex. | Index | Density [kg/m$^3$] | CLD 4/40 [kPa] | Tensile Stress [kPa] | Elong. at Break [%] | DVR 50% [%] | DVR 75% [%] |
|---|---|---|---|---|---|---|---|
| 3a | 100 | 40.9 | 2.73 | 99 | 120 | 4.1 | 6.1 |
| 3b | 80 | 41.8 | 1.82 | 91 | 173 | 6.1 | 7.8 |

LD 4/40: compressive strength 4$^{th}$ cycle at 40% deformation according to DIN EN ISO 3386-1-98.

DVR: compression set at 50% and 75% deformation (DIN EN ISO 1856).

Tnsile stress and elongation at break were determined in accordance with DIN EN ISO 1798.

Examples 4–15

Flexible molded foam parts were produced by the same procedure used in Comparative Example 3. The mold was pretreated in the usual way with a mixture of 95 wt. % of Acmos® 180-52 and 5 wt. % of an additive according to the invention, instead of with only the commercially available mold release agent. The results are summarized in the following tables.

The following additives were used:

A: H$_{12}$-MDI (Desmodur® W, Bayer AG)
B: Isophorone diisocyanate (Desmodur® IPDI, Bayer AG)
D: 1,2,4,5-tetramethylbenzene diisocyanate
E: 1,4-di-(isocyanatomethyl)cyclohexane
F: Dimethyl carbonate
G: Phthalic anhydride
H: Ethyl acetoacetate
I: Urea
J: 1,3-bis-(isocyanato-1-methylethyl)benzene (TMXDI).
K: Trimeric hexamethylene diisocyanate (Desmodur® N3300, Bayer AG),
L: Dimeric hexamethylene diisocyanate (Desmodur® N3400, Bayer AG),
M: β-cyclodextrine The TDA contents of the skin zone of the molded parts were determined and are reported in the Table below.

| Ex. | Index | Add. | 2,4-TDA [ppm]$^a$ | 2,6-TDA [ppm]$^a$ | 2,4-TDA [ppm]$^b$ | 2,6-TDA [ppm]$^b$ | 2,4-TDA [ppm]$^c$ | 2,6-TDA [ppm]$^c$ |
|---|---|---|---|---|---|---|---|---|
| 4 | 100 | D | 1.3 | 75 | 0.5 | 4.9 | <0.2 | 0.3 |
| 5a | 100 | E | 0.5 | 25 | 0.2 | 0.9 | <0.2 | 0.2 |
| 5b | 80 | E | 4.8 | 467 | $^d$ | $^d$ | <0.2 | 24 |
| 6a | 100 | B | <0.2 | 41 | <0.2 | 0.5 | <0.2 | 0.5 |
| 6b | 80 | B | <0.2 | 302 | <0.2 | 7.1 | 0.6 | 7.3 |
| 7a | 100 | A | 0.5 | 15 | <0.2 | 0.7 | <0.2 | 0.3 |
| 7b | 80 | A | 4.7 | 417 | <0.2 | 15 | $^d$ | $^d$ |
| 8 | 100 | F | 1.3 | 99 | 0.2 | 4.0 | <0.2 | 0.3 |
| 9 | 100 | G | 1.2 | 88 | 0.5 | 3.5 | <0.2 | 0.3 |
| 10 | 100 | H | 1.5 | 96 | <0.2 | 3.9 | 0.5 | 0.3 |
| 11 | 100 | I | 0.8 | 93 | <0.2 | 1.4 | 0.4 | 0.3 |
| 12a | 100 | J | 1.0 | 70 | <0.2 | 1.8 | 0.3 | 0.3 |

-continued

| Ex. | Index | Add. | 2,4-TDA [ppm][a] | 2,6-TDA [ppm][a] | 2,4-TDA [ppm][b] | 2,6-TDA [ppm][b] | 2,4-TDA [ppm][c] | 2,6-TDA [ppm][c] |
|---|---|---|---|---|---|---|---|---|
| 12b | 80 | J | 8.2 | 265 | <0.2 | 39 | [d] | [d] |
| 13 | 100 | K | 0.7 | 109 | 0.2 | 1.0 | <0.2 | 0.2 |
| 14 | 100 | L | 0.9 | 145 | <0.2 | 0.6 | 0.5 | 0.6 |
| 15 | 80 | M | 2.3 | 231 | 0.2 | 28 | <0.2 | 9 |

[a]Storage time 24 hours
[b]Storage time 7 days
[c]Storage time 14 days
[d]Not measured The mechanical properties of the molded parts (measured after 7 days) produced in Examples 6a, 6b and 12b were determined and are reported in the Table below.

| Ex. | Index | Density [kg/m³] | CLD 4/40 [kPa] | Tensile Stress [kPa] | Elong. at Break [%] | DVR 50% [%] | DVR 75% [%] |
|---|---|---|---|---|---|---|---|
| 6a | 100 | 40.5 | 2.68 | 98 | 126 | 4.3 | 6.5 |
| 6b | 80 | 41.3 | 1.87 | 92 | 177 | 5.8 | 8.7 |
| 12b | 80 | 40.9 | 1.53 | 99 | 184 | 5.6 | 9.2 |

CLD 4/40: compressive strength $4^{th}$ cycle at 40% deformation according to DIN EN ISO 3386-1-98.

DVR: compression set at 50% and 75% deformation (DIN EN ISO 1856).

Tensile stress and elongation at break determined in accordance with DIN EN ISO 1798.

Examples 16-I to 16-III

Flexible molded foam parts were produced in the same manner as the foams produced in Comparative Example 3. The mold was pretreated in the usual way with a mixture of Acmos® 180-52 mold release agent and various concentrations of IPDI (Desmodur® IPDI, Bayer AG), instead of only with the commercially available mold release agent Acmos 180-52. The results are summarized in the following table.

The TDA content of the skin zone of each of the molded parts is reported in the Table below.

| Ex. | Index | Acmos® 180-52 [wt. %] | IPDI [wt. %] | 2,4-TDA [ppm][a] | 2,6-TDA [ppm][a] | 2,6-TDA [ppm][b] | 2,6-TDA [ppm][b] |
|---|---|---|---|---|---|---|---|
| 16-I | 80 | 99.5 | 0.5 | 11 | 454 | [c] | [c] |
| 16-II | 80 | 98 | 2.0 | 6 | 350 | <0.2 | 1.7 |
| 16-III | 80 | 90 | 10.0 | 2.5 | 240 | <0.2 | 2.9 |

[a]Storage time 24 hours
[b]Storage time 7 days
[c]Not measured

Comparative Example 4

A polyol mixture (A component) was produced from the starting materials listed hereinbelow:

| | |
|---|---|
| 3.2 parts by weight | Water |
| 0.1 part by weight | Blowing catalyst (Dabco ® BL-11, Air Products) |
| 0.25 part by weight | Gel catalyst (Dabco ® 33LV, Air Products) |
| 1.0 part by weight | Diethanolamine (DEOA:) |
| 1.0 part by weight | Silicone stabilizer (Tegostab ® B 8719, Goldschmidt AG) |
| 5.0 parts by weight | Isophorone diisocyanate (Desmodur ® IPDI, Bayer AG) |

This A component was mixed at a temperature of 25° C. with TDI having an NCO content of 48.3 wt. % (Component B: Desmodur® T80, Bayer AG). The mixture was added to a 4.2 liter capacity mold which was temperature controlled to 60° C. and treated with a mold release agent (Acmos® 180-52, ACMOS Chemie GmbH & Co.), and left to foam. The amount of the mixture was calculated so that the resulting molded parts would have a molded part density of 42 kg/m³. To produce molded parts at an NCO Index of 80, the mixing ratio of A component to B component was 105:30.4 (note: the additive Desmodur® IPDI was not included in the calculation of the Index). The mold was closed with a cover and placed in a press or enclosure in order to counteract the foam pressure and to keep the mold closed. After 5 minutes, the cover was removed and the foam was mechanically compressed until it had an open-cell structure, i.e., did not exhibit any shrinkage.

The TDA contents of the skin zone of the molded parts are reported in the Table below.

| Comp. Ex. | Index | 2,4-TDA [ppm][a] | 2,6-TDA [ppm][a] | 2,4-TDA [ppm][b] | 2,6-TDA [ppm][b] |
|---|---|---|---|---|---|
| 4 | 80 | 0.2 | 19 | <0.2 | 0.3 |

[a]Storage time 24 hours
[b]Storage time 7 days

The mechanical properties of the molded parts (measured after 7 days) were determined and are reported in the Table below.

| Comp. Ex. | Index | Density [kg/m³] | CLD 4/40 [kPa] | Tensile Stress [kPa] | Elong. at Break [%] | DVR 50% [%] | DVR 75% [%] |
|---|---|---|---|---|---|---|---|
| 4 | 80 | 41.6 | 3.07 | 118 | 153 | 7.0 | 49.5 |

CLD 4/40: compressive strength $4^{th}$ cycle at 40% deformation according to DIN EN ISO 3386-1-98.

DVR: compression set at 50% and 75% deformation (DIN EN ISO 1856).

Tensile stress and elongation at break were determined in accordance with DIN EN ISO 1798.

Comparative Example 5

The procedure of Comparative Example 4 was repeated with the exception that 5 parts by weight of TMXDI (1,3-bis-(isocyanato-1-methyl-ethyl)benzene) instead of IPDI were added to the polyol formulation.

The TDA contents of the skin zone of the molded parts were determined and are reported in the Table below.

| Comp. Ex. | Index | 2,4-TDA [ppm][a] | 2,6-TDA [ppm][a] | 2,4-TDA [ppm][b] | 2,6-TDA [ppm][b] |
| --- | --- | --- | --- | --- | --- |
| 5 | 80 | 1.5 | 73 | <0.2 | 0.4 |

[a] Storage time 24 hours
[b] Storage time 7 days

The mechanical properties of the molded parts (measured after 7 days) were determined and are reported in the Table below.

| Comp. Ex. | Index | Density [kg/m$^3$] | CLD 4/40 [kPa] | Tensile Stress [kPa] | Elong. at Break [%] | DVR 50% [%] | DVR 75% [%] |
| --- | --- | --- | --- | --- | --- | --- | --- |
| 5 | 80 | 41.2 | 2.23 | 127 | 196 | 7.1 | 56.0 |

CLD 4/40: compressive strength 4$^{th}$ cycle at 40% deformation according to DIN EN ISO 3386-1-98.

DVR: compression set at 50% and 75% deformation (DIN EN ISO 1856).

Tensile stress and elongation at break were determined in accordance with DIN EN ISO 1798.

Comparative Example 6

The procedure of Comparative Example 3 was repeated with the exception that the commercially available mold release agent PURA 1448H (RATEC International GmbH) was used.

The TDA contents of the skin zone of the molded parts were determined and are reported in the Table below.

| Comp. Ex. | Index | 2,4-TDA [ppm][a] | 2,6-TDA [ppm][a] |
| --- | --- | --- | --- |
| 6 | 100 | 3.9 | 207 |

[a] Storage time 24 hours

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a plastic molded part having at least an edge zone, said process comprising
   a) pretreating the mold with a mold release agent containing at least one additive which is reactive with an aromatic amine, said additive being selected from the group consisting of organic cyclic compounds having a molecular weight of from 200 to 3000 g/mole, derivatives of inorganic acids, derivatives of organic acids, derivatives of carbonic acid, urea, and derivatives of urea,
   b) introducing the plastic composition from which the molded part is to be formed into the pretreated mold,
   c) forming the molded part, and
   d) removing the formed molded part from the mold, wherein said additive reacts with the aromatic amine to effectively reduce the concentration of said amine at the edge zone.

* * * * *